US006267186B1

(12) United States Patent
Hayatdavoudi

(10) Patent No.: US 6,267,186 B1
(45) Date of Patent: Jul. 31, 2001

(54) SPOTTING FLUID AND METHOD OF TREATING A STUCK PIPE

(75) Inventor: Asadollah Hayatdavoudi, San Ramon, CA (US)

(73) Assignee: Spectral, Inc., Church Point, LA (US)

( * ) Notice: Subject to any disclaimer, the term of this patent is extended or adjusted under 35 U.S.C. 154(b) by 0 days.

(21) Appl. No.: 09/332,094

(22) Filed: Jun. 14, 1999

(51) Int. Cl.[7] .................................................. E21B 7/00
(52) U.S. Cl. ................................. 175/64; 175/69; 175/70; 175/71; 166/282; 166/300; 166/301; 166/309; 507/940
(58) Field of Search .................................. 166/282, 300, 166/301, 309; 175/64, 65, 68–71; 137/3, 41, 81.2, 805, 814, 237; 507/94 D, 145, 202, 102

(56) References Cited

U.S. PATENT DOCUMENTS

| 2,900,026 | | 8/1959 | Trusheim . | |
|---|---|---|---|---|
| 3,217,802 | | 11/1965 | Reddie et al. . | |
| 4,230,587 | | 10/1980 | Walker . | |
| 4,345,646 | * | 8/1982 | Terrell | 166/55 |
| 4,410,052 | * | 10/1983 | Mamadzhanov et al. | 175/50 |
| 4,427,564 | | 1/1984 | Brownawell et al. . | |
| 4,436,638 | | 3/1984 | Walker et al. . | |
| 4,466,486 | | 8/1984 | Walker . | |
| 4,494,610 | | 1/1985 | Walker . | |
| 4,614,235 | | 9/1986 | Keener et al. . | |
| 4,760,882 | * | 8/1988 | Novak | 166/295 |
| 4,964,615 | | 10/1990 | Mueller et al. . | |
| 5,002,672 | | 3/1991 | Hayes et al. . | |
| 5,127,475 | | 7/1992 | Hayes et al. . | |
| 5,247,992 | | 9/1993 | Lockhart . | |
| 5,415,230 | | 5/1995 | Fisk, Jr. et al. . | |
| 5,671,810 | | 9/1997 | Hodge et al. . | |
| 5,749,422 | * | 5/1998 | Michael | 175/71 |
| 5,755,295 | * | 5/1998 | Hayatdavoudi . | |
| 5,881,813 | * | 3/1999 | Brannon et al. | 166/304 |

* cited by examiner

Primary Examiner—Roger Schoeppel
(74) Attorney, Agent, or Firm—Wenderoth, Lind & Ponack, L.L.P.

(57) ABSTRACT

The method for releasing the stuck pipe of the present invention uses a combination of components which oxidize the mud cake and generated gas bubbles to create an upward buoyancy for the oxidized mud cake. The spotting method of the present invention comprises adding to the borehole in the region of the stuck pipe: 1) an oxidizer which oxidizes the mud cake; and 2) at least one component which reacts in the borehole to generate a gas. Optionally, but preferably, the spotting method further uses a lubricant which is added to the borehole in the region of the stuck pipe. The lubricant acts to lubricate the oxidized parts of the mud cake. Also disclosed is a spotting fluid system including 1) an oxidizer which oxidizes the mud cake, 2) at least one component which reacts in the borehole to generate a gas, and, optionally a lubricant which acts to lubricate the oxidized parts of the mud cake.

4 Claims, 7 Drawing Sheets

SPOTTING FLUID AND METHOD OF TREATING A STUCK PIPE

TECHNICAL FIELD

The present invention relates to a spotting fluid system used to dislodge a stuck drill pipe in subterranean drilling operations. In addition, this invention relates to a method of dislodging a stuck drill pipe which is lodged in subterranean formations.

BACKGROUND OF THE INVENTION

The drilling of oil and gas wells is accomplished by using rotary drilling techniques. In these rotary drilling techniques, a drilling mud is circulated through the drill pipe, out the bit nozzles and it is returned to the surface via an annulus. The drilling mud serves to cool and lubricate the drill bit and drill pipe. In addition, the drilling mud develops a hydrostatic head to counterbalance formation pressures and removes cuttings from the borehole. Further, the drilling mud helps reduce the friction forces between the drill pipe and the borehole.

Even though a drilling mud is used during the subterranean drilling operations, drill bits and drill pipes still become lodged in subterranean formations from time to time. The term "stuck pipe" is conventionally used in the drilling industry to describe this problem. "Stuck pipe" is not limited to drill pipes, but includes drill pipes, drill collars, drill bits, stabilizers, reamers, casings, tubing and other items or tools which may become lodged in drilling operations. When a stuck pipe becomes lodged, it can not be raised, lowered or rotated. A stuck pipe increases the cost of drilling a well due to downtime of the drilling operation. In extreme cases, a stuck pipe may cause the abandonment of the drilling operation at a particular site, if the stuck pipe can not be economically released.

There are many causes of stuck pipe. The industry categorizes the causes as either differential or mechanical sticking.

Differential sticking occurs during most drilling operations. The hydrostatic pressure exerted by the drilling mud column is greater than the formation fluid pressure. In permeable formations, the mud filtrate flows from the borehole into the rock pores and builds up a filter cake. A pressure differential exists across the filter cake which is equal to the difference between the pressure of the mud column and the pressure of the formation.

When a pipe is central in the borehole, the hydrostatic pressure, due to the mud overbalance, acts in all directions around the pipe. If, however, the pipe touches the filter cake, the mud overbalance acts to push the pipe further into the filter cake, thus increasing the contact area between the pipe and the filter cake. Filtrate is still expelled and squeezed from the filter cake between the pipe and the formation thus shrinking the cake and allowing the pipe to penetrate further into the filter cake, thereby further increasing the contact area. If the pressure difference is high enough and acts over a sufficiently large area, the pipe may become stuck. Differential sticking usually occurs when the pipe has been motionless for a period of time, e.g., when making a pipe connection or during surveying.

The force required to pull differentially stuck pipe free depends on many factors including:

(1) The difference in the pressure between the borehole and the formation. Any overbalance adds to side forces which may exist due to the deviation of the hole.

(2) The surface area of the pipe embedded in the wall cake. The thicker the cake or the larger the pipe diameter, the greater this area generally is.

(3) The bond developed between the pipe and the wall cake is a very significant factor, being directly proportional to the sticking force. This can include frictional, cohesive and adhesive forces. It generally tends to increase with time, making it harder to pull the pipe free.

Differential sticking may be distinguished from other forms of sticking, such as mechanical sticking. Mud circulation is not interrupted as there is no obstruction in the borehole to stop the flow, as would be the case for pipe stuck due to hole bridging or caving. It is not possible to move or rotate the pipe in any direction.

When a pipe sticks, the driller usually tries to free it by mechanical movement, e.g., by pulling, jarring or, if the pipe was moving immediately prior to sticking, trying to move the pipe in the opposite direction. Frequently this fails to release the pipe and there is, of course, a limit to the force which can be applied, since too much force could pull the pipe apart and make the situation worse.

If the pipe remains stuck, it is then sometimes the practice to apply a pipe release agent, commonly called a "spotting fluid". These spotting fluids are chemically active mixtures, which may be oil or water based, which are placed over the stuck region in an attempt to free the pipe, if mechanically working the pipe fails to release the pipe. These spotting fluids are believed to act by attacking the mud filter cake. They are positioned in the borehole by pumping the spotting fluid down the hole to the stuck region in the form of a slug, also known as a pill. The pill generally contains sufficient material to cover the stuck zone and extend slightly beyond the area of the stuck zone. Pills frequently are left to soak the cake until the pipe is free or attempts to free the pipe are abandoned.

Over the years, many spotting fluids and spotting methods have been developed to lubricate the area of the stuck pipe which has become lodged and to aid in the releasing of the drill bit from the formation, freeing a stuck drill pipe.

In one prior art stuck pipe treatment, hydrocarbon oils, such as diesel oil, are injected into the borehole in the area of the stuck pipe. The mixture of the diesel oil and drilling mud provides a low density, lubricating environment around the stuck point of the drill. Further, the hydrocarbon rises due to its buoyancy, which causes the removal of the mud around the stuck point and makes well bore pressure ($P_w$) ≦ the formation pressure ($P_f$) See, for example, U.S. Pat. No. 3,217,802 to Reddie.

Attempts have been made to improve the effectiveness of hydrocarbon based spotting fluids by adding additional components to the hydrocarbon based spotting fluids. For example, U.S. Pat. No. 5,671,810 to Hodge et al. adds a carboxylic acid or a polycarboxylic acid and a surfactant to a hydrocarbon spotting fluid; U.S. Pat. No. 4,436,638 to Walker et al., adds a propoxylated $C_{18}$–$C_{32}$ alcohol and an oil soluble emulsifier to a hydrocarbon based spotting fluid; and U.S. Pat. No. 4,427,564 to Brownawell et al. adds a propoxylated lactone acid and an oil soluble emulsifier to a hydrocarbon based spotting fluid.

In a different approach, U.S. Pat. No. 2,900,026 to Trusheim discloses the addition of at least a 10 percent solution of hydrogen peroxide to a borehole having a stuck drill pipe to disintegrate the wall cake which causes the lodging to the drill pipe. In addition, this patent teaches that the addition of a small amount of caustic soda and soda will aid the action of the hydrogen peroxide.

Aqueous spotting fluids have also been previously used in the art. U.S. Pat. No. 4,466,486 to Walker discloses a method for freeing stuck drill pipes by adding a mixture of water or brine with a cellulose polymer or a polyether polymer as a spotting fluid. Further, other methods for freeing stuck pipes include using water-based spotting fluids, such as U.S. Pat. No. 4,230,587 to Walker, which discloses a mixture of water or brine with a mixture of polyethylene glycols as a spotting fluid; U.S. Pat. No. 4,494,610 to Walker, discloses a spotting fluid comprising a lower alcohol with another component, such as water, and optionally weighting agent; and U.S. Pat. No. 4,614,235 to Keener et al., discloses adding a mono or polyalkylene glycol ether to a water based spotting fluid.

Recently, acid and ester based spotting fluid have been prepared and used to release stuck pipes. In particular, a carboxylic acid, such as acetic acid as is disclosed by U.S. Pat. No. 5,247,992 to Lockhart; fatty acid alkyl esters containing spotting fluids are disclosed by U.S. Pat. No. 4,964,615 to Mueller et al.; and a spotting fluid which is non-toxic and comprises glycerol-phosphoric acid ester and a polyacyloxy polycarboxylic acid esters of mono and/or diglycerides is disclosed in U.S. Pat Nos. 5,002,672 and 5,127,475 to Hayes et al.

Finally, a multi-step spotting method is disclosed by U.S. Pat. No. 5,415,230 to Fisk, Jr. et al. In the first step of this patent, a spotting pill containing brine is pumped into the region of the stuck pipe and allowed to soak. A second spotting pill is pumped into the region of the stuck pipe and is also allowed to soak. The second spotting fluid can be any spotting fluid known to those skilled in the art. The spotting fluid is allowed to soak in place for an extended period or until the pipe becomes free.

SUMMARY OF THE INVENTION

The present invention employs a very different approach employing a multi-component addition to the borehole. The method for releasing the stuck pipe of the present invention uses a combination of components which oxidize the mud cake, and generates gas bubbles through reaction with the mud cake to create an upward buoyancy for the oxidized mud cake, as well as general lightening of the hydrostatic head column at the same time. The spotting method of the present invention comprises adding to the borehole in the region of the stuck pipe:

1) an oxidizer which oxidizes the mud cake;
2) at least one component which reacts in the borehole to generate a gas; and
3) optionally, at least one component which contains a reducer.

In a second aspect of the present invention the spotting method further uses a lubricant which is added to the borehole in the region of the stuck pipe. The lubricant acts to lubricate the oxidized parts of the mud cake and the pipe.

In a third aspect of the present invention, a spotting fluid system is disclosed. The spotting fluid system comprises at least two separate components, a) an oxidizer which oxidizes the mud cake; and b) at least one component which reacts in the borehole with the oxidizer to generate a gas. The spotting fluid system can optionally contain a lubricant which acts to lubricate the oxidized parts of the mud cake and the pipe. In addition, an article of manufacture comprising at least two or three separate containers, depending whether or not the lubricant is present. A first container or containers comprise the oxidizer, a second container or containers comprise a component, which will react in the borehole to generate gas bubbles and a third container or containers, which are optional, comprise the lubricant. Additionally, a reducer can be added to one of the containers, provided it will not react with the other components in the container. As an alternative, the reducer can be present in a separate container.

Another aspect of this invention is a method for dislodging a stuck pipe in a borehole of a downhole well drilling operation which comprises adding to the borehole a solution comprising (i) an hydrogen peroxide and (ii) water or brine. It has been discovered that of solution of hydrogen peroxide, at a relatively low concentration, can be used to dislodge a stuck pipe, if the a drilling mud comprises, as a drilling fluid, at least one of the following modules (A)–(E)

(A) an alkaline first module that contains (a) a source of caustic, (b) a natural wax, (c) a natural thinner, (d) glycerol, and (e) phosphoric acid and/or boric acid, (B) a second module prepared by reacting (f) aluminum metal with the components of said alkaline first module thereby forming a soluble alkali metal aluminate, (C) a third module comprising said components of said first module in combination (g) with at least one of an alkali metal phosphate, borate and sodium silicate, (D) a fourth module comprising said components of said first module in combination with (h) a saturated or unsaturated carboxylic acid source, or (E) a fifth module comprising said components of said first module in combination with (h) a saturated or unsaturated carboxylic acid source, and (g) at least one of an alkali metal phosphate, borate and sodium silicate.

In another aspect of this invention, one or more modules of a modular drilling fluid, described above, can also be used as a spotting fluid. Typically, the drilling fluid is added as a spotting fluid in a well where the mud has not previously been treated with one or more of the modules of the modular drilling fluid. However, one or more modules of the modular drilling fluid can be used in drilling mud already treated with one or more modules of the modular drilling fluid, as a spotting fluid.

In a final aspect of this invention, a completion fluid, containing one or more of the modules of the modular drilling fluid is also disclosed.

DETAILED DESCRIPTION OF THE INVENTION

Figure 1:
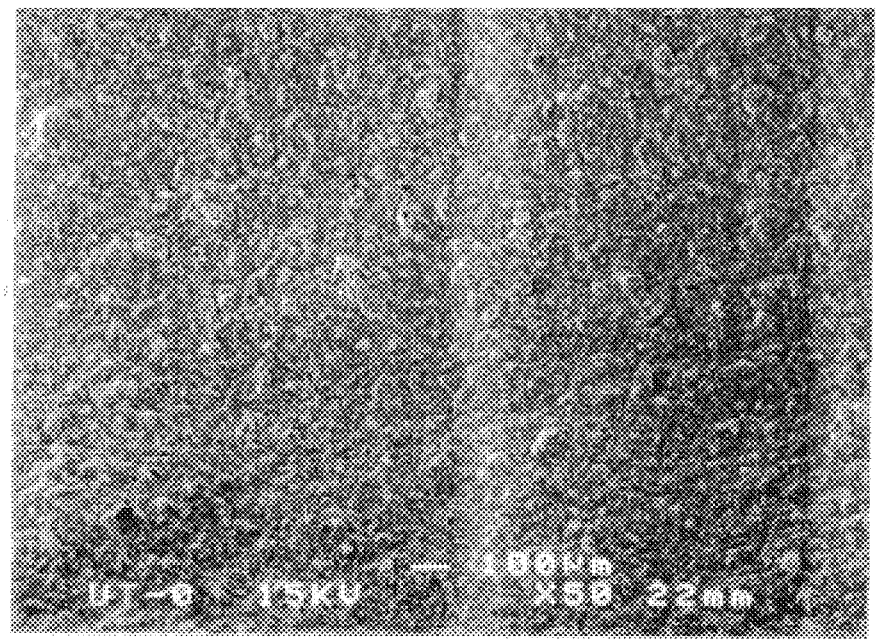
FIG. 1, shows a scanning electron image of a mud filter cake.

In the present invention, the order in which the components of the spotting fluid of the first three aspects of this invention are added or injected into the well is not critical.

It is preferred, however, that the oxidizer is first added to the borehole so that the mud filter cake will be oxidized prior to the addition of the component which reacts in the well bore to generate a gas. Likewise, when a lubricant is used in the spotting fluid and spotting method of the present invention, it can be added before the oxidizer, before the gas generating component, or after both the oxidizer and the gas generating component. Preferably, the lubricant, when added, is added in between the oxidizer and the component which will generate gas.

The oxidizer used in the method of dislodging the stuck pipe and in the spotting fluid of this invention is a component which will oxidize the mud filter cake. Any component which will react to oxidize the mud cake can be used. In addition, the oxidizer tends to swell the mud cake. Examples of such components include hydrogen peroxide; hypochlorites, such as sodium hypochlorite, potassium hypochlorite, lithium hypochlorite, calcium hypochlorite or magnesium hypochlorite; or peroxides, such as hydrogen peroxide, alkali metal peroxides, alkaline earth metal peroxides or manganese group peroxides. Of these oxidizers, hydrogen peroxide is preferred.

The oxidizer portion of the spotting fluid and method of the present invention can be added or injected to the borehole alone or added or injected as a solution. In considering handling aspects, it is preferable that the oxidizer is added as a solution. Any acceptable carrier can be used to form a solution with the oxidizer, so long as the carrier does not interfere with the oxidation of the filter cake. Example of acceptable carriers include, but are not limited to, mineral oil, water, brine, etc. Typically, the carrier for the oxidizer is selected so that it is compatible with the drilling mud used in the particular drilling operation. For example, if a water-based drilling mud is being used in the drilling operation, the oxidizer can be added or injected into the borehole in a solution with fresh water or brine. Likewise, if an oil-based drilling mud is being used, the carrier for the oxidizer is selected accordingly.

The concentration of the oxidizer in the solution can be up to about 95% by weight or volume. From a practical stand point, the oxidizer is present in the solution in an amount up to 50% by weight or volume, preferably in an amount between 1 and 10% by weight or volume, and most preferably between 1.5 and 5% by weight or volume. Preferably, the oxidizer used in the method of this invention and spotting fluid system is hydrogen peroxide. Preferably, the hydrogen peroxide is in fresh water or brine at a concentration of about 1.5 to 5% by weight or volume.

The oxidizer or oxidizer in solution can further contain a weighting agent. Weighting agents are added to adjust the density of the oxidizer to correspond to the density of the drilling mud used in the drilling operation. The change in density can be an increase (positive weighting) or a decrease (negative weighting). Examples of weighting agents include barite, hematite, calcium carbonate, iron carbonate, foams, mist and others known to those skilled in the art. Foams and mist are examples of negative weighting agents. The weighting agent is added to the oxidizer or reducer in an amount up to about 90% by weight or volume, however, the amount of the weighting agent will vary from well to well. The appropriate amount of weighting agent is typically determined by personnel at the drilling site.

The oxidizer is pumped through the drill pipe to the site of the stuck pipe. Once in the region of the stuck pipe, the oxidizer will oxidize, diffuse into and swell the mud filter cake. This filter cake is typically thick and "sticky" and is formed across the permeable formation in the stuck pipe section of the borehole. Often, due to the existence of a high differential pressure between the well bore ($P_w$), and the formation pressure ($P_f$), ($P_w > P_f$), the filter cake grows to a point that the hole diameter becomes smaller than the external diameter of the drill string and the bottom hole assembly. This causes the bottom hole assembly to stick differentially to the hole wall or to become imbedded in the thick filter cake.

As stated above, the addition of the oxidizer oxidizes and swells the filter cake and sometimes disintegrates the filter cake so that the lubricant and component which generates gas in the borehole of the present invention are not needed. But this usually depends on the severity of the problem, including thickness and make-up of the mud filter cake.

A second component of the spotting fluid or spotting process of the present invention is component which will react in the borehole to generate gas. The gas can be any gas, including but not limited to, carbon dioxide, hydrogen, oxygen, nitrogen and others. The generation of gas lowers the density of the mud filter cake surrounding the stuck portion of the pipe and creates an upward buoyancy for these mud cake particles. The gas pressure generated in the borehole creates a blistered and bubbling permeable formation which enables the pipe to break free from the mud filter cake and, hence, become unstuck. Not wishing to be bound by theory, it is believed that the gas bubbles migrate upward through the mud column, along with the lubricant, when present, thereby decreasing the well bore pressure $P_w$, with respect to the formation pressure, $P_f$. When $P_w \leq P_f$, the pipe will become free upon exertion of some mechanical pulling or turning action. In addition, as the generated gas is subjected to a reduced pressure, for examples as the gas reaches the surface or permeates the filter cake, the gas expands. As the gas volume expands, the well bore pressure must decrease. This also causes stuck pipe differential pressure to reverse itself from $P_w > P_f$ to $P_w \leq P_f$ thus releasing the stuck pipe and destroying the wall filter cake.

Any component which will generate gas by reaction with another component in the borehole can be used. It is noted, however, that components which will or could have an adverse effect of the drilling operations or which will produce hazardous by-products should be avoided. For example, components which will react violently, or explode, should be avoided. Examples of gas generating component include components which will react with the oxidizer. If the oxidizer is hydrogen peroxide, examples of gas generating components include sodium hypochlorite, potassium hypochlorite, lithium hypochlorite, calcium hypochlorite and magnesium hypochlorite; and peroxides such as alkali metal peroxides, alkaline earth metal peroxides and manganese group peroxides. The by-products of these components are typically salts of the metals, water and gas. If the oxidizer is one of the components mentioned above for the gas generating component, the gas generating component can be, for example, hydrogen peroxide.

Other components which will react in the borehole to generate gas can be used. These components can react with components in the drilling mud, lubricants or other additives present in the borehole. An example of such a component is sodium bicarbonate, which will generate carbon dioxide. Sodium bicarbonate is an attractive gas generating component since it is relatively easy to handle, relatively inexpensive and will react with acids or bases present in the borehole. Further, the sodium bicarbonate may be lightened by the lubricant, polymers or waxes. In one aspect of the present invention, an acid, such as citric acid, acetic acid, oxalic acid or other carboxylic acids, boric acid, phosphoric acid or vinegar having an acidity of 5% or more, is added to or injected into the borehole. The acid can be added, for example, in a lubricant (discussed hereinbelow) which is injected or added to the borehole. Once this acid is in the borehole, the gas generating component is added and will react with the acid to generate a gas, in this case, carbon dioxide. Alternatively, the gas generating component can be added to the borehole, followed by the addition of another component which will react with this gas generating component.

Other examples of gas generating components include hydrazine, and manganese oxide among others. In addition, the gas generating component may react with the reducer.

The gas generating component of the spotting fluid and spotting method of the present invention can be added or injected to the bore hole alone or added or injected as a solution. In considering handling aspects, it is preferable that the gas generating component is added in a solution. Any acceptable carrier can be used to form a solution with the gas generating component, so long as the carrier does not interfere with the gas generating capacity or ability of this component. Examples of acceptable carriers include, non-toxic mineral oil, water, brine, etc. Typically, the carrier for the oxidizer is selected so that it is compatible with the drilling mud used in the particular drilling operation. For example, if a water-based drilling mud is being used in the drilling operation, the gas generating component can be added or injected into the borehole in a solution with fresh water or brine. Likewise, if an oil-based drilling mud is being used, the carrier for the oxidizer is selected accordingly.

The concentration of the gas generating components in the solution can be up to about 95% by weight or volume. From a practical stand point, the gas generating component is present in the solution in an amount up to 60% by weight or volume and preferably in an amount between 1 and 10% by weight or volume. Preferably, the gas generating component used in the spotting method and in the spotting fluid system of the present invention is sodium hypochlorite when the oxidizer is hydrogen peroxide. Preferably, the sodium hypochlorite is in fresh water or brine at a concentration of about 1.0 to 10% by weight or volume.

The gas generating component or solution thereof can further contain a weighting agent. As stated above, weighting agents are added to adjust the density of the gas generating component to correspond to the density of the drilling mud used in the drilling operation. The change in density can be an increase (positive weighting) or a decrease (negative weighting). Examples of weighting agents include barite, hematite, calcium carbonate, iron carbonate, foams, mist and others known to those skilled in the art. Foams and mist are examples of negative weighting agents. The weighting agent is added to the gas generating component in an amount up to about 60% by weight or volume, however, the amount of the weighting agent will vary from well to well. The appropriate amount of weighting agent is typically determined by personnel at the drilling site.

Optionally, any component which acts as a reducer can also be added to the well and can be part of the spotting fluid system. Like the oxidizer and gas generating component, the reducer can be added in a solution.

In the spotting method and spotting fluid system of the present invention, a lubricant can also be used or is part of the system. Any lubricant typically used in drilling operations can be used as a lubricant of the present invention. Examples of lubricants include, but are not limited to, mineral oil, glycols, esters, vegetable oils, synthetic oils and fatty acid sources. In addition, drilling fluid compositions having lubricating properties can also be used. Examples of such drilling fluids include the modular drilling fluid described U.S. Pat. No. 5,755,295. This modular drilling fluid system can be conveniently formulated as at least one of the following modules:

(1) an alkaline first module that contains a source of caustic, a natural wax, and a natural thinner;

(2) a second module prepared by reacting aluminum metal with the components of the alkaline first module thereby forming a soluble alkali metal aluminate;

(3) a third module containing the components of the first module in combination with at least one of an alkali metal phosphate, alkali metal borate and sodium silicate;

(4) a fourth module containing the components of the first module in combination with a $C_{1-24}$ saturated or $C_{2-24}$ unsaturated carboxylic acid source, a surfactant, and a preservative; and (5) a fifth module containing the components of the first module in combination with a carboxylic acid source, a surfactant, a preservative, and at least one of an alkali metal phosphate, alkali metal borate and sodium silicate.

It has further been discovered that a combination of glycerol and phosphoric and/or boric acid added to any one of the forgoing modules can further improve some properties of this modular drilling fluid. The improved properties include improved lubricity of the drilling mud, mud thinning and mud viscosity control, decreased bit "balling" tendencies, decrease in the cohesive or shearing resistance beneath the drill bit and improved control of phase separation of the mud. This modified modular drilling fluid, mud and associated methods of using the modified fluid and mud are the subject U.S. patent application Ser. No. 09/083,051, filed on May 22, 1998 now U.S. Pat. No. 6,105,691. In addition, a salt water-based drilling mud is disclosed in U.S. patent application Ser. No. 09/236,568, which contains the modular drilling fluid.

Module 1

Module 1 is the principal drilling fluid additive. It can be used alone or in combination with one or more of the other modules as discussed herein below. Module 1 is a caustic (alkaline) drilling fluid. Caustic can be sodium or potassium hydroxide. This composition further comprises one or more natural waxes and one or more natural thinner. Typically the pH of a Module 1 formulation is 11 or greater. Such a high pH increases the dispersability of the mud, thereby facilitating the drilling operation.

A natural wax used in this composition facilitates the formation of emulsions and assists in coating solid particles released by drilling. Exemplary natural waxes which can be used in the composition are montan wax, waxes extracted from carnauba palm tree, cotton lintres, lignite deposits, and the like.

A natural thinner is also provided in Module 1, and as used herein refers to a natural colloidal clay dispersion. Exemplary natural thinners include lignins, tannins and negatively charged derivatives of humic acid.

The combination of caustic, natural wax, and natural thinner as described above is sometimes referred to herein as a "scour kier liquor", or its equivalent lignin and tannins and is a principal ingredient of the instant drilling mud system. Preferably, the first module is composed of a "scour kier liquor" which contains a caustic at a pH of 11 or above, as well as a natural wax and a natural thinner, such as a lignin and/or a tannin. The scour kier liquor referred to herein is typically obtained by the alkaline digestion of cellulosic fibers, e.g., cotton pulp, and is described further herein below.

A preferred scour kier liquor is commercially available from Barnhardt Industries (Charlotte, N.C.). The kier liquor may also be combined with oxidizing agents such as peroxide, sodium hypochlorite, and the like.

This module may further comprise glycerol, phosphoric acid and/or boric acid, and optionally a gel. The glycerol, phosphoric acid and/or boric acid is added to produce glyceroborates e.g., glyceroboriborate, and glycerophosphates.

The addition of glycerol, in accordance with the present invention, boosts the lubricity of the module. This is due to glycerol's low molecular weight and high solubility in water-based or oil based muds. Glycerol further facilitates the rapid diffusion of the modular drilling fluid in the mud filter cake, porous media (e.g., rock) and clay masses adhering to the stuck section of the drill pipe. Glycerol is added in an amount between 0.0027% by volume to 95% by volume of the module, preferably in an amount up to 40% by volume.

Phosphoric acid and/or boric acid is added to this module. Typically, the phosphoric acid and/or boric acid is added in an amount between 0.0008% and 95% by volume, preferably up to 35% by volume, assuming a 70% or higher concentration of the acid. The phosphoric acid and/or boric acid will react with the glycerol in a condensation reaction to produce a phosphate, a borate ester or combination of borophosphate esters. Due to the temperature and pressure in the borehole, a reaction of the glycerol with phosphoric acid and/or boric acid further takes place in the borehole. This reaction product has an anionic head, comprising the phosphate or the borate anions which will coat, attach, adhere or associate with the cations on the edge of the clay particles. The attraction between the anionic heads and the cations of the clay edges causes an increase in the total negative charges of the clay particles thus deflocculating or dispersing of the clay slurry or mud filter cake, clay adhering to the stuck section of the drill pipe (so-called bit "balling" phenomenon) and the weakening of the clay "cements" holding the rock grains together.

The weakening of the clay "cements" further decreases the strength of the mud and the compressed and thickened mud wall around the stuck section of the drill string, through a capillary action by the modular drilling mud or fluid system. Once penetrating the structure of the clay "cement" through capillary pressure, the anionic heads of the phosphate, borate or combination borophosphate esters will deflocculate and weaken the cement. This is like driving a wedge between adjacent cemented particles in the region of the stuck pipe section.

In addition, the phosphate, borate or combination borophosphate esters will have tails that allow for solubility of the esters in the water phase of the drilling fluid. With this solubility, the filtrate of the modular drilling fluid is allowed to diffuse through capillary action into the porous media (e.g., rock or thick, compressed mud wall in the stuck section of the pipe).

The gel is optionally added to the modular drilling mud or fluid system to reduce phase separation and settling of the particles during storage. The gel further controls the excessive loss of the components of the spotting fluid system to which the modular drilling fluid system is added. Typically, the gel is added in an amount of 0.001 lb. to 100.0 lb. per barrel, preferably in an amount of 0.001 to 10.0 lb. per barrel.

Module 2

This module represents a thickener or oil solidifier in which aluminate ions have been provided. Whenever the aluminate ions are added to the drilling fluid prior to pulling the drill assembly out of the hole, the gel strength of the mud increases. This means that the thixotropic properties of the drilling fluid can be changed as desired, thus permitting cuttings entrained in the mud to be suspended. This module is added to the spotting system and method when there is a loss of thixotropic characteristics in the drilling mud. In addition, whenever any of Module 1, discussed above, and Modules 3 and 4, discussed below, are combined with oil, the addition of Module 2 causes the oil to solidify, i.e., to a rubbery or thick grease. The degree of oil solidification can be readily altered by adjusting the concentration of aluminum metal, which results in a change in the concentration of aluminate ions.

Preferably, the second module is an aluminated scour kier liquor in which aluminum metal has been reacted with the scour kier liquor to produce aluminate ions in the presence of lignins and/or tannins. The aluminate ions react with the lignins and tannins, thereby crosslinking them and increasing the cutting suspension capability of the drilling mud. Any alkali metal aluminate can be used, however, a particularly preferred alkali metal aluminate is sodium or potassium aluminate.

A preferred Module 2 formulation can be prepared by combining aluminum metal, in the form of shavings, fines, and the like, with sodium hydroxide or potassium hydroxide and water in the presence of lignins or tannins. In the manufacture process of the caustic soda, the caustic reacts with the aluminum metal to produce sodium aluminate or potassium aluminate and hydrogen gas. Some of the aluminate ions so formed react with the lignins or tannins, thereby crosslinking them. It is believed that whenever the crosslinked product is added to a clay suspension a partially reversible net charge is placed on the clay particles, which increases the gel strength of the mud. This is clearly shown in Tables 1 and 2 of U.S. Pat. No. 5,755,295. This is a strongly desired property especially while the drilling fluid is quiescent in a horizontal, lateral, directional or deviated hole, e.g., in river crossing, environmental remediation wells, or trenching operations.

A suitable Module 2, or thickener, can be typically prepared by adding 0.2–1.5 lb. of Al metal to 1 bbl of scour kier liquor.

Module 3

Module 3 of the modular drilling fluid system represents a primary thinner formulation. Functionally, this module counter-balances Module 2. In this primary thinner composition, one least one of an inorganic phosphate, an inorganic borate and an inorganic silicate is combined with a caustic thinning composition as in Module 1. Optionally, lignite can be combined with the other components of this module. The resulting formulation is a high pH super thinner. Considering the components of the composition, good performance at both low and high temperatures is expected.

A particularly preferred composition with a primary thinner of Module 3 comprises scour kier liquor (containing waxes and other organic materials) in combination with trisodium phosphate (TSP) and sodium silicate. Another preferred formulation includes scour kier liquor, lignite, and TSP, or a mono-, di-, or tri-sodium, potassium, or cesium phosphate, sodium acid pyrophosphate, sodium orthophosphate, borates and sodium silicate. When using this composition, the waxes and other organic material (or lignite when it is used) can effectively coat colloid particles to protect them from attack by contaminants while dispersing them at the same time controllably, which produces a stable suspension condition.

A preferred formulation for module 3 can be prepared by combining with 1 bbl of scour kier liquor, each of 1–50 lb of trisodium phosphate, 0.25–2 lb sodium silicate, and 1–10 lb of borax. The borax is an optional component that is useful in some applications.

Whenever lignite and hot water are used in an amount of about 1.0 to 3.0 pounds per gallon of hot water and, for example, TSP is added, the viscosity of this newly discovered reaction product can be varied from about that of water, representing a thin fluid, to that of a solid tar or asphalt, a very thick material. This material can be used, for instance, to plug a fracture in the hole or to prevent mud losses from the hole. This variation in viscosity is due to variations in the concentration of TSP in the composition.

Module 4

This module provides a secondary thinner formulation as well as a surfactant and preservative, which can be combined with any of the previous modules as needed.

Preferred components in this module are those which enhance the emulsification of oil, such as a saturated or unsaturated carboxylic acid rich source, e.g., vegetable oil or a natural ester such as cottonseed oil, jojoba oil, and the like. Preferably, the carboxylic acid source is a $C_{1-24}$ saturated or $C_{2-24}$ unsaturated carboxylic acid or a synthetic ester, such as, polyalphaolefin. This component affords a secondary thinning capability. Other preferred anionic or nonionic emulsifiers (surfactants) include those having a suitable HLB (hydrophilic-lipophilic balance), alkylbenzene sulfonates, tergitol, or TRITON (available from Union Carbide Corp., Danbury, Conn.).

The preservative present in this module helps to protect against bacteria and is preferably a chelating agent, such as table salt, driller salt and salts of ethylenediamine tetraacetate (EDTA) and borax. Other suitable preservatives include boric acid or derivatives thereof and salt.

A representative formulation of this module is as follows in a water base (1 bbl): 1–10 lb borax, 0.5–10 lb borateam (which includes a sulfonated alkyl benzene-anionic surfactant), and 0.2–1 lb EDTA (Na or K salt). About 0.5–10 lb of TRITON (a nonionic surfactant) can also be optionally provided.

The carboxylic acid of module 4 will also react with the organic or inorganic acid of phosphoric acid and/or boric acid, when present. This reaction occurs in the bore hole under the temperature and pressure of bore hole. The reaction product is a phosphate lipid, a borate lipid or a combination borophosphate lipid. Like the phosphate esters and borate esters described above, the phosphate lipid and borate lipids have anionic head which are attracted to the cations of the edge of the clay particles. Hence, these lipids have a similar function and effect as the esters described above.

Module 5

This module represents a combination of Modules 1, 3 and 4 discussed above. This composition is a super-thinner-dispersant-lubricant formulation that is preferably used in treatments of 0.5 to 2.0% by volume in the mud system, such as fresh water mud, lime mud or salt mud. Use of this combination of Modules 1, 3, and 4 increases the deflocculation, lubricity and thinning dramatically.

Functionally, in the combined modules a polymerized phosphate and/or borate ester is formed which possesses the high lubricity properties of esters as well as the thinning capabilities of negatively charged phosphate and/or borate ions. The amount of esterification can be easily altered by adjusting the concentration of phosphate and/or borate.

A preferred composition for this module, is formed by combining the compositions of modules 1, 3, and 4 in the amounts detailed above with an oil base. Preferably, the oil, such as cottonseed oil or a synthetic oil like polyalpholefin (PAO), is provided in an amount up to 90% of the total volume. Preferably up to 10%, but optionally up to 20%, of the oil content can be replaced with a mineral oil, such as FGA.

The composition identified herein as formulation (I) is composed of scour kier liquor (SKL) or equivalent lignin and tannins, TSP, sodium acid pyrophosphate (SAPP), borax, borateam, cottonseed oil and water in the relative amounts indicated above.

Each of the forgoing modules can further contain additives such as graphite, to improve the color of the composition. In addition other additives can be added to improve the smell of the modules. These additives will be readily apparent to those skilled in the art and should be selected so that the properties of the drilling mud are not adversely affected.

In the spotting method and spotting fluid system of the present invention, the preferred lubricant is module 5 of the modular drilling fluid. Particularly preferred is module 5 containing glycerol, and phosphoric and/or boric acid. This provides the best all-around properties for the spotting fluid and spotting method of the present application.

In the preferred spotting method of the present invention the oxidizer, lubricant and gas generating component are added or injected into the borehole in the following manner.

First, a "head" portion or "pill" is added or injected into the borehole. The head portion contains the oxidizer which will oxidize the mud cake in the stuck region.

Second, a "middle" portion or "pill" is then added or injected into the borehole. This middle portion contains a lubricant described above which lubricates the oxidized parts of the mud cake.

Third, a "tail" portion or "pill" is then added or injected into the borehole. This tail portion is reactive in the borehole and results in the generation of bubbles of gas, thereby reducing the density of the mud surrounding the stuck portion and generating upward buoyancy. The gas pressure creates a blistered and bubbling mud cake or mud which enables the pipe to move, hence become unstuck. The formation of gas bubbles creates a system wherein the pressure in the stuck region is less than or equal to the mud column pressure. In other words, the reaction causes the differential pressure to be equalized or reversed ($P_w \leq P_f$), thus releasing the differentially stuck pipe. Moreover, the buoyancy, lubricity plus oxidation and/or reduction or disintegration of the thick and compressed cake results in the cake having no cohesion, whereby it is lifted upwardly, facilitating elimination of the stuck portion. The reaction is usually with the oxidizer in the head portion and components present in the lubricant.

The head portion preferably contains hydrogen peroxide or sodium bicarbonate in a solution. The concentration of the hydrogen peroxide or sodium bicarbonate in the solution is preferably about 1.5 to 10.0% by weight or volume of the solution, preferably 1.5 to 5.0% by weight or volume.

The lubricant is then added or injected into the borehole. As is stated above, the preferred lubricant is module 5 of the modular drilling fluid of application Ser. No. 09/083,051, filed on May 22, 1998. This module, with its high concentration of an oil, e.g. vegetable oil may also provide for lifting of the mud cake, in addition to the lubricating action. This module can be charged with sodium bicarbonate.

Finally, after addition of the lubricant, the component which will generate gas bubbles is added to the well. Preferably, the component is sodium hypochlorite and/or acids, such as citric acid, acetic acid, other carboxylic acids, boric acid, phosphoric acid, vinegar having an acidity of 5% or more, dilute hydrochloric acid, or a mud acid. The preferred form to add sodium hypochlorite is as a solution in water or brine at a concentration of about 1 to 50% by weight or volume, preferably 1–10% by weight or volume.

Examples of possible gas generation reactions which can be used in the present invention include, but are not limited to, any one of the following equations:

1. Sodium bicarbonate and citric acid $$3\ NaHCO_3 \rightarrow 3Na^+ + 3(HCO_3)^-$$

$$3Na^+ + 3(HCO_3)^- + C_6H_8O_7(\text{citric acid}) \rightarrow 3\ CO_2\uparrow + Na_3C_6H_5O_7 \cdot 3\ H_2O$$

2. Sodium bicarbonate and boric acid $$NaHCO_3 \rightarrow Na^+ + (HCO_3)^-$$

$$(HCO_3)^- + B(OH)_3 \rightarrow CO_2\uparrow + B(OH)_4^-$$

3. Calcium phosphate and sodium bicarbonate $$Ca(H_2PO_4)_2 \cdot 2\ H_2O + 2\ NaHCO_3 \rightarrow 2\ CO_2\uparrow + 4\ H_2O + Na_2Ca(HPO_4)_2$$

4. Hydrazine reactions to give nitrogen $$N_2H_4 + 4\ OH^{31} \rightarrow N_2\uparrow + 4\ H_2O$$

$$N_2H_4 + O_2 \rightarrow N_2\uparrow + 2\ H_2O$$

5. Hydrogen peroxide and sodium hypochlorite $$H_2O_2 + NaOCl \rightarrow H_2O + NaCl + O_2 \rightarrow$$

6. Permanganate and oxalic acid $$2\ MnO_4\ (aq) + 6\ H^+ + 5\ H_2C_2O_4 \rightarrow 2\ Mn^{2+} + 10\ CO_2 \rightarrow + 8\ H_2O$$

7. Acetic acid and Sodium bicarbonate $$2\ NaHCO_3 \rightarrow 2\ Na^+ + 2\ (HCO_3)^-$$

$$2\ Na^+ + 2\ (HCO_3)^- + HC_2H_3O_2(\text{acetic acid}) \rightarrow CO_2 \rightarrow + Na_2CO_3 + H_2O + H^+ + [C_2H_3O_2]^-$$

Finally, it has been discovered that the addition of hydrogen peroxide in a solution water or brine, can dislodge a stuck pipe, alone, if the drilling mud is a drilling mud comprising, as a drilling fluid, at least one of the following modules (A)–(E)

(A) an alkaline first module that contains (a) a source of caustic, (b) a natural wax, (c) a natural thinner, (d) glycerol, and (e) phosphoric acid and/or boric acid, (B) a second module prepared by reacting (f) aluminum metal with the components of said alkaline first module thereby forming a soluble alkali metal aluminate, (C) a third module comprising said components of said first module in combination (g) with at least one of an alkali metal phosphate, borate and sodium silicate, (D) a fourth module comprising said components of said first module in combination with (h) a saturated or unsaturated carboxylic acid source or a synthetic ester such as polyalphaolefin, or (E) a fifth module comprising said components of said first module in combination with (h) a saturated or unsaturated carboxylic acid source, and (g) at least one of an alkali metal phosphate, borate and sodium silicate.

Surprisingly, it has also been discovered that at relatively low concentrations of hydrogen peroxide to a borehole having a stuck pipe, will result in the freeing of the stuck pipe. Prior art method using hydrogen peroxide required high concentrations of hydrogen peroxide. In the present invention, the concentration of hydrogen peroxide can be a little as 1.5% and is preferable in a concentration of less than 5.0%.

It has also been discovered that the addition of one of the modules of the modular drilling fluid can be effective as a stuck pipe treatment. As is shown in Example 1 below, the addition of module 5 of the modular drilling fluid will effectively release a stuck pipe.

The amount of each of the pills of the spotting fluid in the present invention used to release a stuck pipe varies depending on the diameter of the hole, the length of the stuck section, and the other factors, such as fluid loss in the formation. Typically, an excess amount of the pills is added to the well to account for losses and to extend above and below the stuck section of the pipe. In the present invention, the amount of the individual pills or entire spotting system generally ranges between 1 and 1000 bbl.

The inventor has also discovered that a completion fluid, containing one of the forgoing modules is also effective in the methods of this patent. A completion fluid is added to the hole to displace the mud and the completion fluid contains no solids. The completion fluid invades the formation and physically plugs and prevents flow from the well. Typically, a completion fluid is water or brine with heavy gel and/or polymeric components. The inventor has found that adding one of the modules of the modular drilling fluid to these components, a very effective completion fluid is prepared.

The invention will now be described by way of examples which illustrate the present invention but do not limit it.

EXAMPLE 1

One hundred fifty gallons of Module 5 is prepared by mixing 75 gallons cottonseed oil(with preservatives), 1 quart of glycerol, 1 quart of phosphoric acid, 4 lb. of gel, 42 gallons of water, 10 lb. of salt (NaCl), 1 quart of EDTA, 1 quart of boric acid, 10 lb. of borateem, 6 lb. of borax, 12 gallons of hot water (150° F.), 30 lb. of trisodium phosphate, 25 lb. of lignite, 1 quart of caustic soda, 25 lb. of graphite.

125 gallons of Module 5 was added to a well having a stuck casing in Mississippi Canyon Field. Approximately 200 barrels of a drilling mud was present in the spotting operation. After Module 5 was added to the area of the stuck portion of the pipe and allowed to soak, surprisingly after about 20 minutes to about one hour the casing was released from the formation by applying mechanical force to the drill string.

EXAMPLE 2

(Preparation of the Filter Cake)

A mud filter cake was prepared containing bentonite (gel), a weighting agent comprising barite, water, Module 5, prepared in Example 1 above, caustic soda, lignite and sodium polyacrylamide. The mud filter cake was formed in accordance with the API standard of 100 psi pressure differential and 30 min. time of filtration.

EXAMPLE 3

Figure 2A:
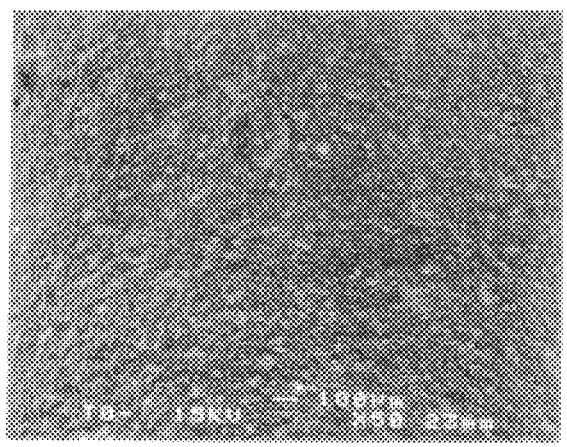
FIGS. 2A, 2B, 2C, 2D and 2E show a scanning electron image of a filter cake treated with a 1.5% or 3.0% solution of hydrogen peroxide alone.
Figure 2B:
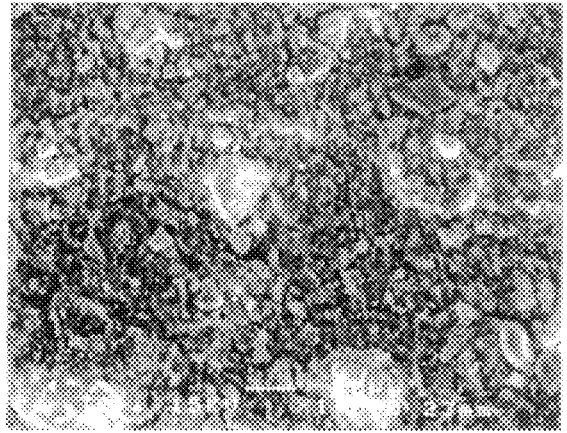
Figure 2C:
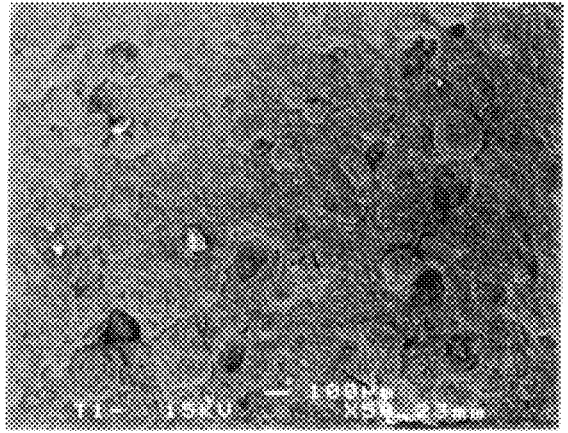
Figure 2D:
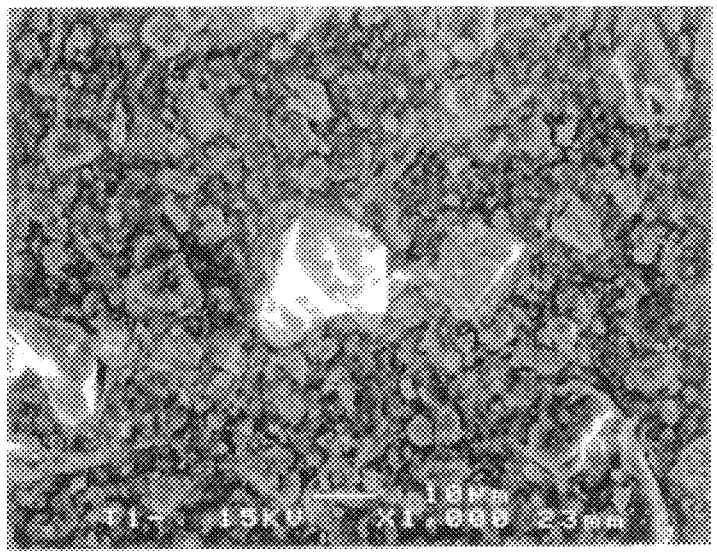
Figure 2E:
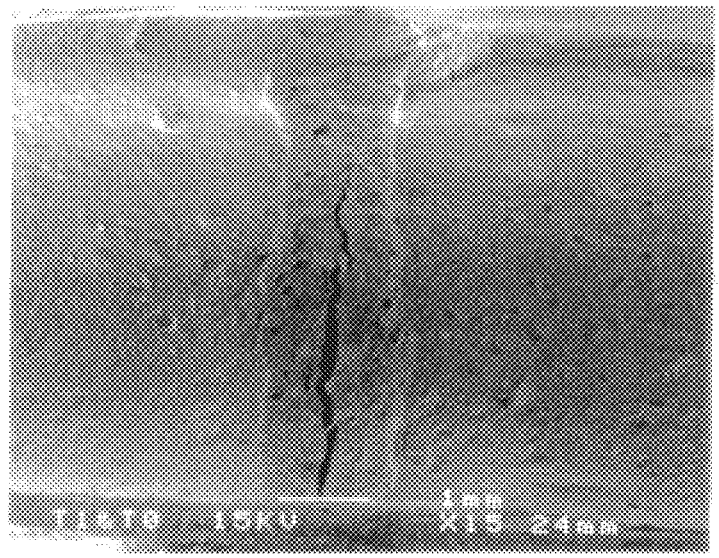

The mud filter cake prepared in accordance with Example 2, was treated with a 1.5% or 3.0% solution of hydrogen peroxide and allowed to soak for a period of time. The scanning electron images are show in the figures of FIG. 2. FIG. 2A shows, at ×50 magnification, a filter cake treated with a 1.5% solution of hydrogen peroxide alone. FIG. 2B shows the same treated mud at ×1000 magnification. (FIG. 2C) shows the mud filter cake treated with a 3.0% solution of hydrogen peroxide alone, at ×50 magnification, and (FIG. 2D), shows the same at ×1000 magnification.

Comparing these figures to FIG. 1, it can be seen that the hydrogen peroxide tends to form potholes in the mud filter cake which indicates a disintegration of the sticky, thick mud filter cake. Further, it can be seen that the 3% solution of the hydrogen peroxide is more effective at oxidizing the mud filter cake than the 1.5% solution of hydrogen peroxide.

EXAMPLE 4

Figure 3A:
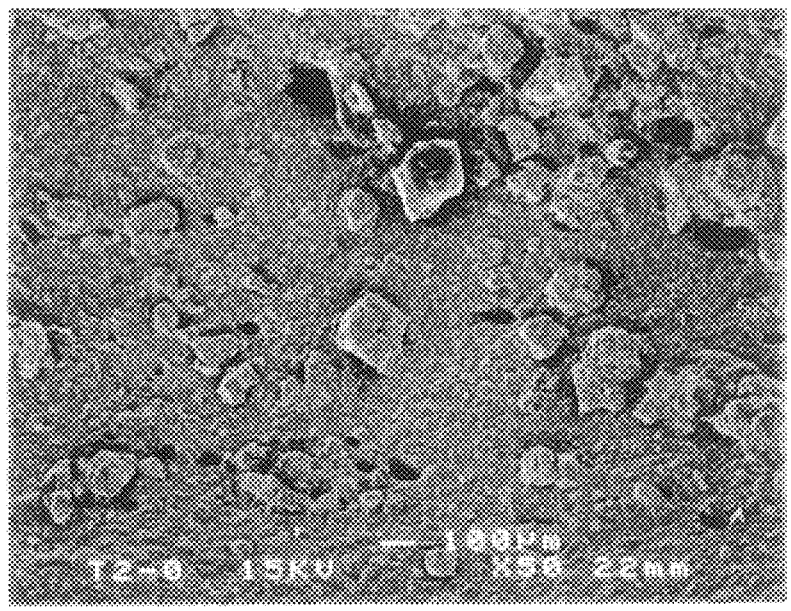
FIGS. 3A, 3B, 3C show a scanning electron image of a filter cake treated with a 1.5% solution of hydrogen peroxide and a 0.8% concentration of module 5 of the modular drilling fluid at a magnification of ×50, ×100 and ×2000, respectively.
Figure 3B:
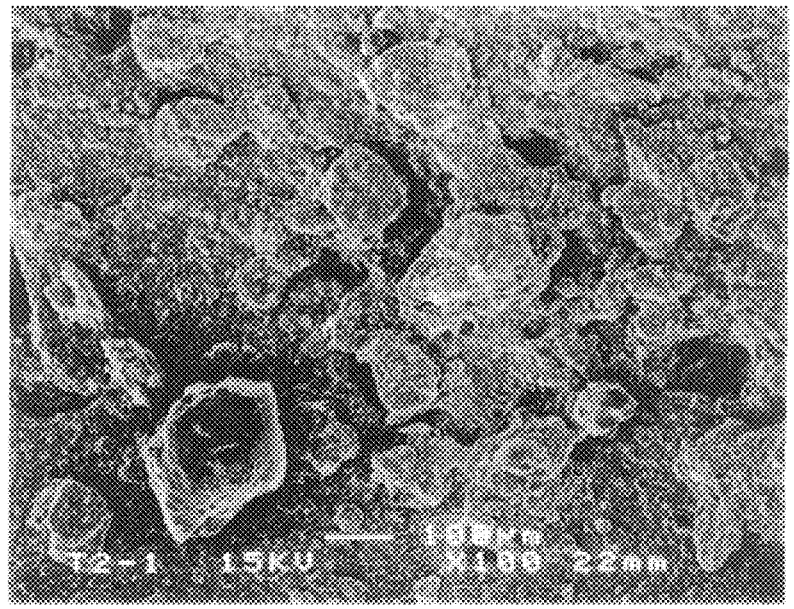
Figure 3C:
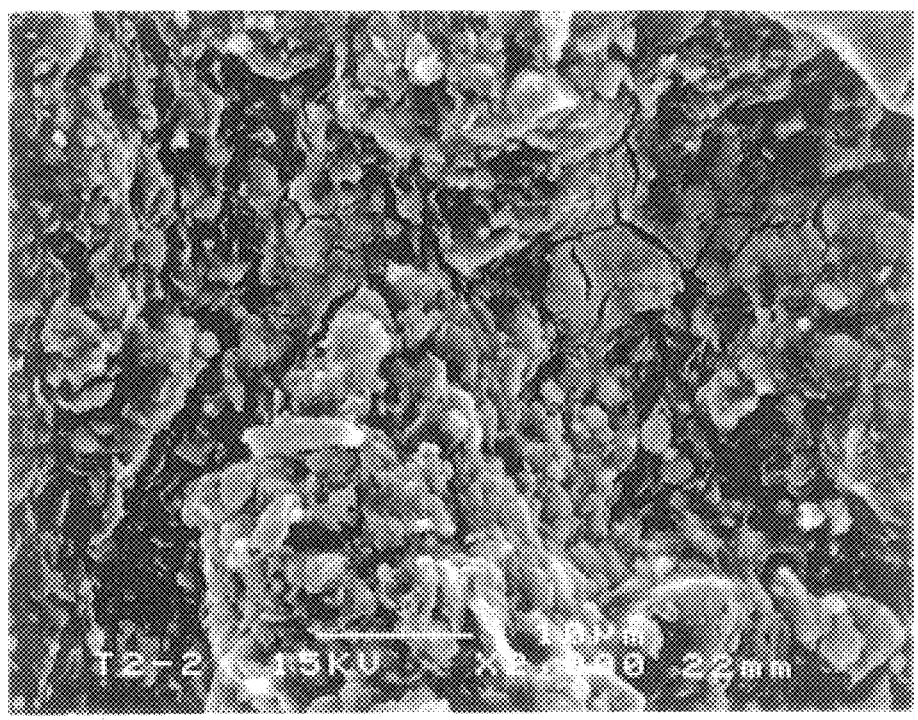

The mud filter cake prepared in accordance with Example 2, was treated with a 1.5% solution of hydrogen peroxide and allowed to soak for a period of time. Then an addition of 0.8% concentration of Module 5, prepared in Example 1 was added to the filter cake and allowed to soak. FIGS. 3A, 3B and 3C show a scanning electron image of a filter cake at a magnification of ×50, ×100 and ×2000, respectively. Again note the formation of potholes in the filter cake which shows that the combination of the hydrogen peroxide and the Module 5 are effective at disintegrating, the mud filter cake.

EXAMPLE 5

Figure 4A:
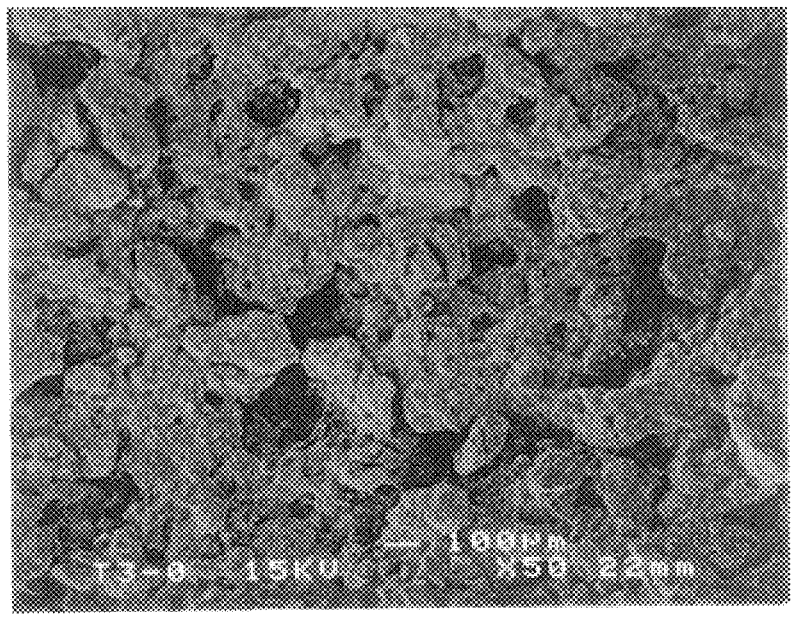
FIGS. 4A, 4B, 4C show a scanning electron image of a filter cake treated with a 3.0% solution of hydrogen peroxide, a 0.8% concentration of module 5 of the modular drilling fluid at a magnification and 5.25% solution of sodium hypochlorite of ×50, ×500 and ×2000, respectively.
Figure 4B:
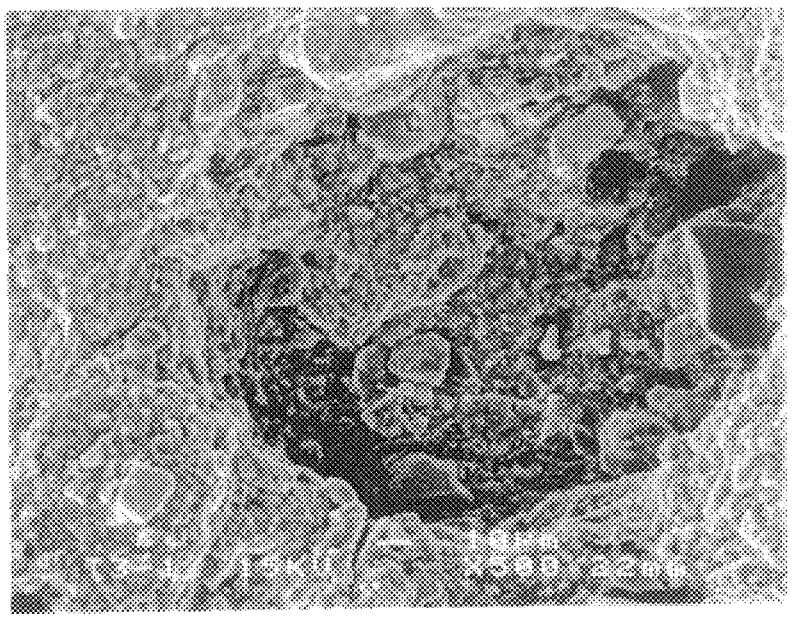
Figure 4C:
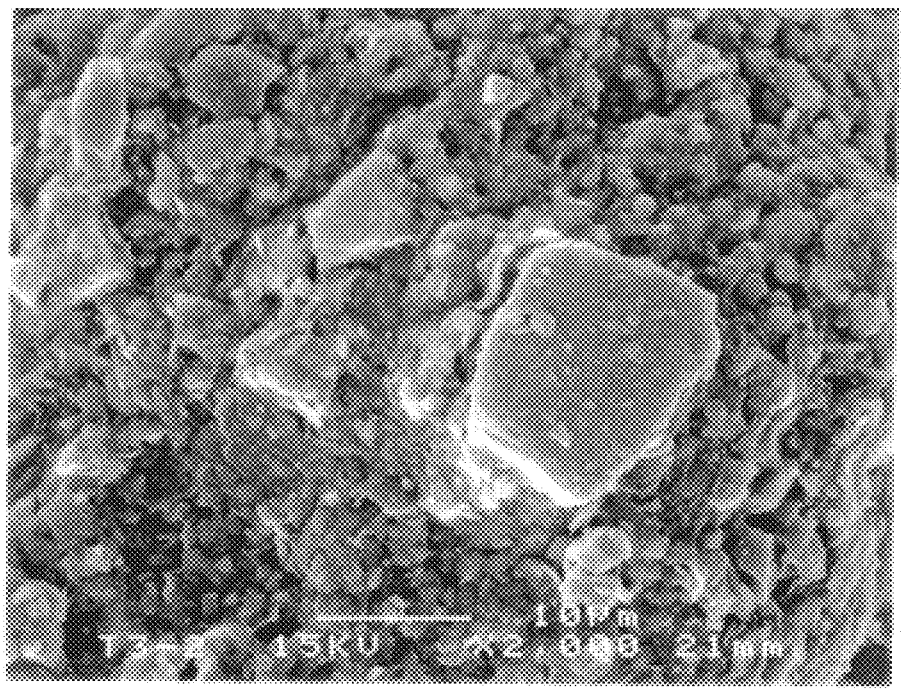

The mud filter cake prepared in accordance with Example 2, was treated with a 3.0% solution of hydrogen peroxide and allowed to soak for a period of time. Then an addition of 0.8% concentration of Module 5, prepared in Example 1 was added to the filter cake and allowed to soak. Finally, a 5.25% solution of sodium hypochlorite was added to the filter cake. FIGS. 4A, 4B, 4C show a scanning electron image of a filter cake treated at ×50, ×500 and ×2000, magnification, respectively. As can be seen, the addition of all three components to the mud filter cake, the potholes formed in the mud filter cake are larger, indicating the oxidation, blistering and removal or lifting of particles from the filter cake by the generation of the oxygen gas from the reaction of the hydrogen peroxide and the sodium hypochlorite. The combination of the hydrogen peroxide and sodium hypochlorite is very effective in releasing stuck pipes.

It is additionally pointed out that the sodium hypochlorite could be added to the filter cake before the addition of the hydrogen peroxide. Stated another way, the order in which the components of the spotting fluid and method of the present invention are added to a borehole can be reversed.

What is claimed is:

1. A spotting a fluid system which dislodges a stuck pipe in a well bore of a down hole well drilling operation comprising:
   a) an oxidizer;
   b) at least one component which reacts in the well bore to generate carbon dioxide; and
   c) optionally a reducer.

2. The spotting fluid system according to claim 1 wherein the component which generates carbon dioxide is sodium bicarbonate.

3. The spotting fluid system according to claim 1 wherein the oxidizer is a peroxide or a hypochlorite.

4. The spotting fluid system according to claim 3 wherein the oxidizer is hydrogen peroxide.

* * * * *